(12) United States Patent
Suzuki et al.

(10) Patent No.: US 7,447,411 B2
(45) Date of Patent: Nov. 4, 2008

(54) PHOTONIC STRUCTURE

(75) Inventors: Akiko Suzuki, Tokyo (JP); Akinobu Sato, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 12/072,360

(22) Filed: Feb. 25, 2008

(65) Prior Publication Data

US 2008/0205842 A1 Aug. 28, 2008

(30) Foreign Application Priority Data

Feb. 27, 2007 (JP) ............................. 2007-046720

(51) Int. Cl.
*G02B 6/10* (2006.01)
(52) U.S. Cl. ...................... 385/129; 385/131
(58) Field of Classification Search .......... 385/129–131
See application file for complete search history.

(56) References Cited

U.S. PATENT DOCUMENTS

| | | | |
|---|---|---|---|
| 6,775,448 B2 * | 8/2004 | Zoorob | 385/122 |
| 6,941,055 B2 * | 9/2005 | Segawa et al. | 385/129 |
| 7,113,319 B2 * | 9/2006 | Segawa et al. | 359/245 |

FOREIGN PATENT DOCUMENTS

| | | |
|---|---|---|
| JP | 2003-139978 | 5/2003 |
| JP | 2005-275161 | 10/2005 |

OTHER PUBLICATIONS

Miyazaki, Hiroshi, "Oyo Buturi" vol. 74, pp. 202-207 (2005), published by the Japan Society of Applied Physics, with an English translation of Chapter 3.
Joannopoulos, J.D., et al., "Photonic Crystals: Molding the Flow of Light" § 7.3 Printon University Press, 1995; pp. 100-104.

* cited by examiner

*Primary Examiner*—Sarah Song
(74) *Attorney, Agent, or Firm*—David N. Lathrop; Gallagher & Lathrop

(57) ABSTRACT

A photonic structure has rods arranged with periodicity which is of a non-translational symmetry and defined in a polar coordinate system, which uses a distance in a radial direction and an angle in a circumferential direction, and has a center of the polar coordinate system used as a reference. A heterointerface is provided between adjoining areas of the plurality of areas. The positions of the centers of the polar coordinate systems of the plurality of areas are different. Lines of rods are smoothly connected between adjoining areas of the plurality of areas at the heterointerfaces. Rods are removed in a spiral shape or in a curve whose radius of curvature changes, to form an optical waveguide in the spiral shape or in the curve.

10 Claims, 20 Drawing Sheets

| n | Dn (μm) | Bn | θn (Degree) |
|---|---|---|---|
| 1 | 0.85 | — | — |
| 2 | 1.70 | — | — |
| 3 | 2.55 | — | — |
| 4 | 3.40 | — | — |
| 5 | 4.25 | -0.80 | 14.4 |
| 6 | 5.10 | -0.67 | 12 |
| 7 | 5.95 | -0.57 | 72/7 |
| 8 | 6.80 | -0.49 | 9 |
| 9 | 7.65 | -0.44 | 8 |
| 10 | 8.50 | -0.40 | 7.2 |
| 11 | 9.35 | -0.37 | 72/11 |
| 12 | 10.20 | -0.34 | 6 |
| 13 | 11.05 | -0.31 | 72/13 |
| 14 | 11.90 | -0.28 | 5 |

| n | Dn (μm) | Bn | φn (Degree) | Δn (Degree) | Nn |
|---|---|---|---|---|---|
| 1 | 0.85 | — | — | — | — |
| 2 | 1.70 | — | — | — | — |
| 3 | 2.55 | — | — | — | — |
| 4 | 3.40 | — | — | — | — |
| 5 | 4.25 | -0.800 | 14.40 | 54.40 | 8 |
| 6 | 5.10 | -0.667 | 12.00 | 22.50 | 15 |
| 7 | 5.95 | -0.571 | 10.29 | 13.09 | 21 |
| 8 | 6.80 | -0.500 | 9.00 | 9.33 | 26 |
| 9 | 7.65 | -0.444 | 8.00 | 5.30 | 32 |
| 10 | 8.50 | -0.440 | 7.20 | 4.93 | 37 |
| 11 | 9.35 | -0.364 | 6.55 | 3.57 | 43 |
| 12 | 10.20 | -0.333 | 6.00 | 2.94 | 48 |
| 13 | 11.05 | -0.308 | 5.54 | 2.46 | 53 |
| 14 | 11.90 | -0.286 | 5.00 | 2.09 | 58 |
| 15 | 12.75 | -0.267 | 4.80 | 1.80 | 63 |

FIG.15

PHOTONIC STRUCTURE

BACKGROUND OF THE INVENTION

1. Field of the Invention

The present invention relates to photonic crystals, and more particularly, to a photonic structure in which a curved optical waveguide, such as a spiral optical waveguide, can be formed.

2. Description of the Related Art

Artificial structural members in which the refractive index is changed periodically are called photonic crystals. Since photonic crystals can highly control light, they are expected to be used for next-generation optical devices. Due to their periodicity, photonic crystals have band structures called photonic bands, as solids have electronic-energy band structures. A gap between photonic bands is called a photonic band gap. Light falling in a wavelength band corresponding to the photonic band gap cannot propagate through the photonic crystal. When a line-shaped defect region is provided in photonic crystal having the photonic band gap, however, the light falling in a wavelength band corresponding to the photonic band gap can be guided along the line-shaped defect region because the light is confined in the defect region by a photonic band gap effect.

Conventionally, photonic crystals having translational symmetry in their refractive-index periodic structures similar to that in solid crystal periodic structures have been extensively researched (for example, see "Photonic Crystals: Molding the Flow of Light" J. D. Joannopoulos, R. D. Meade, and J. N. Winn, Princeton University Press, 1995). As for two-dimensional photonic crystals having translational symmetry, the periodic structures of tetragonal lattices and triangular lattices have been examined. FIG. 20A shows an example two-dimensional photonic crystal having a tetragonal lattice. Rods 11 having a high refractive index are arrayed in air. A photonic band gap appears when the array period, radius, and refractive index of the rods 11 are appropriately selected. FIG. 20B shows an example fundamental structure of an optical waveguide 12 formed in the two-dimensional photonic crystal having the tetragonal lattice. The optical waveguide 12 is formed by removing lines of the rods 11 having a periodic structure. Light propagates through the removed lines of rods 11. The optical waveguide 12 can be a straight line, but even when it has a corner as shown in FIG. 20B, it can guide light with low loss. The bending angle of an optical waveguide is specified by the periodicity of the crystal. It is 90 degrees for tetragonal lattices and 120 degrees for triangular lattices.

Photonic structures having no translational symmetry have also been researched. A photonic structure having rotational symmetry and periodicity defined by a polar coordinate system is disclosed, for example, in Japanese Patent Application Laid Open No. 2003-139978. This photonic structure, called a polar-coordinate-system photonic crystal, has no translational symmetry, but has periodicity in the radial direction and the circumferential direction in the polar coordinate system. A photonic band gap was observed in a polar-coordinate-system photonic crystal having five-fold rotational symmetry. It is shown that it is possible to form not only a straight-line-shaped optical waveguide but an arc-shaped optical waveguide, which is impossible to form in translationally symmetric lattices (such as tetragonal lattices and triangular lattices).

A photonic structure having no periodicity was also reported, for example, by Hiroshi Miyazaki, OYO BUTURI, Volume 74, pp. 202-207 (2005), published by the Japan Society of Applied Physics. This photonic structure is called an amorphous photonic-crystal material. It is shown that a photonic band gap exists even without periodicity. The light-guiding characteristics of a bent optical waveguide having a straight-line defect region was examined.

In an optical circuit in which a light emitting device, a light receiving device, an optical modulation device, and other devices are integrated, optical waveguides are used to exchange light among the devices. When photonic-crystal optical waveguides are used, since the optical waveguides can be bent sharply, the optical circuit can be made compact. In that case, curved optical waveguides are effective because the incident and exit angles of the light and the guide distances can be controlled. In particular, spiral optical waveguides or optical waveguides having curves that are parts of spirals are effective because the radius of curvature can be changed.

When the optical fiber part of a fiber optic gyroscope (hereinafter called an FOG) can be replaced with a photonic-crystal optical waveguide, the FOG is reduced in size. Since the sensitivity of the FOG is proportional to the area enclosed by the optical fiber part, when a photonic-crystal optical waveguide is used instead of the optical fiber part, it is necessary that the optical path length per unit area in the plane be made longer. It is effective to form the photonic-crystal optical waveguide in a spiral shape.

Conventionally, however, when it is attempted to make a spiral optical waveguide in a periodic structure with a two-dimensional tetragonal lattice or triangular lattice, the flexibility of shape design is low and a smooth curve cannot be obtained because optical waveguides can be bent only at specific bending angles such as 90 degrees or 120 degrees.

Conventionally, in polar-coordinate-system photonic crystals, rods constituting a concentric circuit can be removed to form a circular optical waveguide. However, the shape cannot be made spiral.

In amorphous photonic structures, it has been confirmed that a photonic band gap exists even when rods having a high refractive index are arranged at random in a material having a low refractive index. When some of the rods arranged at random are removed to form an optical waveguide, however, it has been shown that good guiding characteristics cannot be obtained. To improve the guiding characteristics, it is known that it is necessary to array rods at both sides of the optical waveguide in a straight line and periodically. If this measure is taken, the rod arrangement becomes the same as that of an optical waveguide formed in a photonic structure having translational symmetry. Little research has been conducted concerning the guidelines for forming an optical waveguide having a desired shape in amorphous photonic structures having no translational symmetry.

SUMMARY OF THE INVENTION

Accordingly, an object of the present invention is to provide a photonic structure capable of implementing a curved optical waveguide whose radius of curvature is changed.

In a first aspect of the present invention, a photonic structure having no translational symmetry is provided. The photonic structure is provided with a plurality of areas each having refractive-index elements arranged with periodicity defined in a polar coordinate system, which uses a distance in a radial direction and an angle in a circumferential direction, and has a center of the polar coordinate system as a reference. A heterointerface is provided between adjoining areas of the plurality of areas. The positions of the centers of the polar coordinate systems of the plurality of areas are different.

In a second aspect of the present invention, a photonic structure having no translational symmetry is provided. The photonic structure is provided with a plurality of areas each having refractive-index elements arranged with periodicity defined in a polar coordinate system, which uses a distance in a radial direction and an angle in a circumferential direction, and has a center of the polar coordinate system as a reference. A heterointerface is provided between adjoining areas of the plurality of areas where periods of variation in the refractive indexes are changed discontinuously.

In a third aspect of the present invention, a photonic structure having no translational symmetry, no rotational symmetry, and no regularity defined by a polar coordinate system is provided. The photonic structure is provided with a plurality of lines of refractive-index elements each arranged spirally such that the distances between a predetermined reference point and the refractive-index elements are gradually changed as the directions in which the refractive-index elements are disposed with respect to the reference point are changed. Each line of the whole or a part of the plurality of lines of refractive-index elements is connected to another line of the whole or the part of the plurality of lines of refractive-index elements at a line segment passing through the reference point.

BRIEF DESCRIPTION OF THE DRAWINGS

FIG. 15 shows a table indicating example values of arrangement conditions for rods shown in FIG. 14;

DETAILED DESCRIPTION OF THE PREFERRED EMBODIMENTS

Embodiments of the present invention will be described below.

First Embodiment

Figure 1:
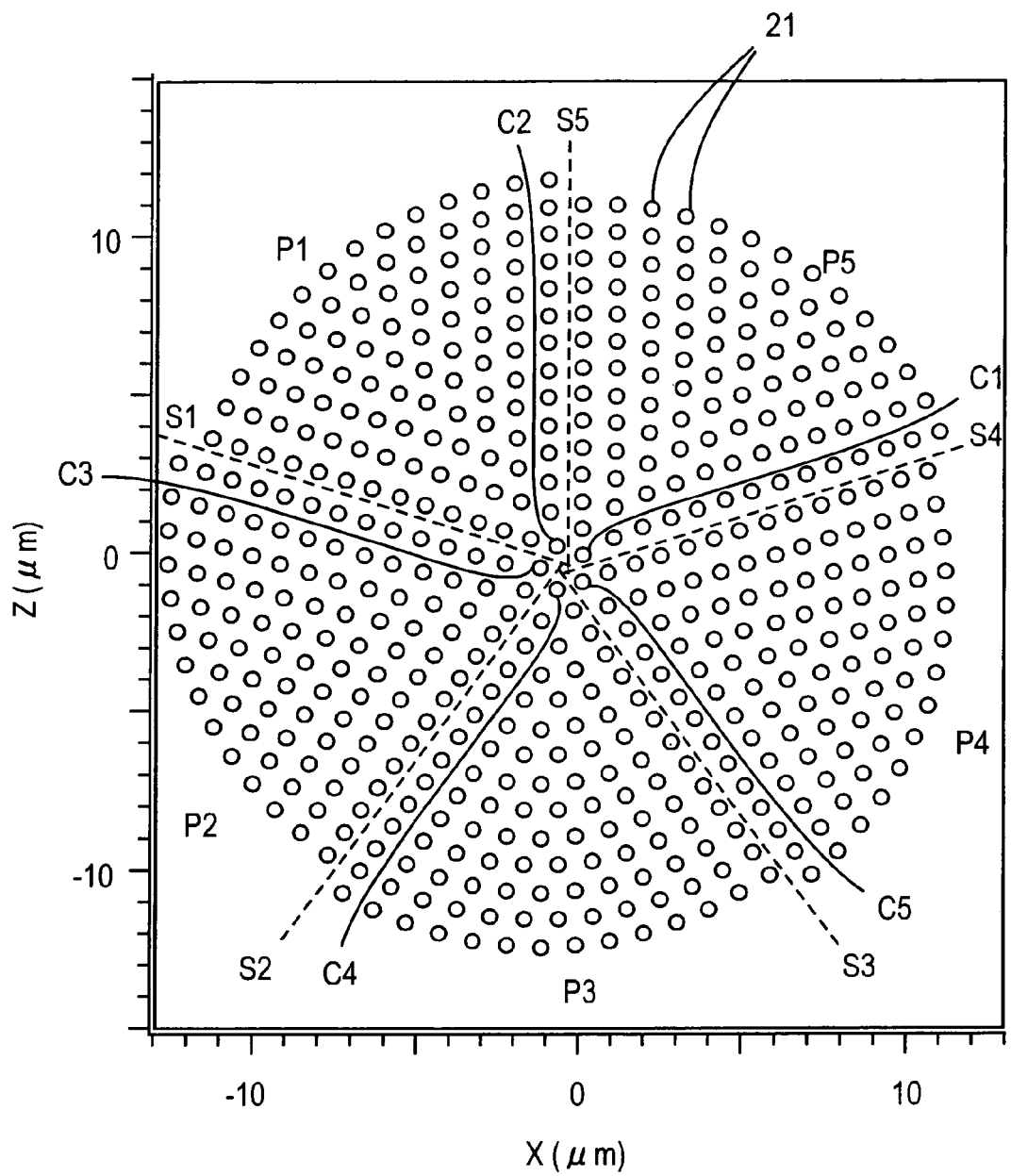
FIG. 1 shows an example photonic structure according to a first embodiment of the present invention.

FIG. 1 shows an example photonic structure according to a first embodiment of the present invention. The photonic structure is formed of five sector-shaped polar-coordinate-system photonic crystals in each of which the refractive index changes periodically defined in the polar coordinate system, where the position of a point is identified by the distance in the radial direction and the angle in the circumferential direction. The five photonic crystals have the same structure. In FIG. 1, P1 to P5 indicate areas where the five photonic crystals are disposed.

Figure 2:
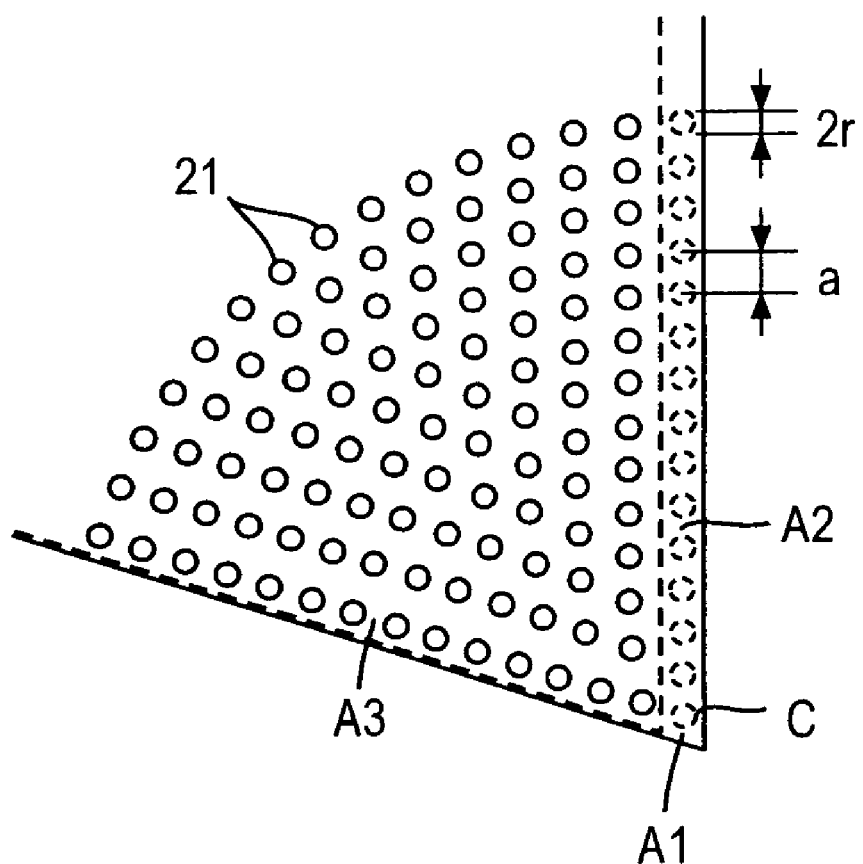
FIG. 2 shows a sector-shaped polar-coordinate-system photonic crystal serving as a structural unit in FIG. 1.

FIG. 2 shows one of the photonic crystals, which is a structural unit of the photonic structure shown in FIG. 1, where C indicates the center of the polar coordinate system. A case where rods 21 are used as refractive-index elements is taken as an example here. The refractive-index elements have a certain refractive index and produce periodicity of the refractive index in the photonic structure. The rods 21 have a diameter of 2r and are arrayed in a radial direction in a sector at an array period of a to form periodicity in the polar coordinate system. In the current case, the rods 21 are arranged concentrically in 15 turns. The sector has a center angle of 72 degrees and the number of rods 21 in each turn is increased by one towards the outer side. In other word, in a first sector-shaped area A1 between two solid lines, a refractive-index element is disposed at the center of the corresponding polar coordinate system and a plurality of refractive-index elements are arranged on respective arcuate line sections of concentrical circles around the center of the polar coordinate system.

One line of rods 21 indicated by broken lines and arrayed in the radial direction is removed. In other words, a second sub-area A2 between the right broken line and the right solid line are removed from the first sector-shaped area, the second sub-area having a line of refractive-index elements extending in a radial direction along one of boundaries in a circumferential direction of the first sector-shaped area. In FIG. 2, a portion between two broken lines (portion having rods 21 indicated by solid lines) serves as each structural unit combined in FIG. 1. In FIG. 2 the left broken line and the left solid line are illustrated at different places to each other as a mere explanation purpose, but the two lines are in fact at the same place.

The sector-shaped polar-coordinate-system photonic crystal configured as described above is disposed at each of the areas P1 to P5 shown in FIG. 1. In other words, an area A3 which is between the two broken lines and formed by removing the second sub-area A2 from the first sector-shaped area A1 corresponds to areas P1-P5, respectively. An interface (called a heterointerface) where the areas P1 and P2 contact (adjoin) is called S1, as indicated in FIG. 1. Interfaces between the other areas are called S2 to S5. The heterointerface is a boundary plane where areas having different refractive-index periodic structures contact each other.

The centers of concentric circles made by the rods 21 in the areas P1 to P5, that is, the centers of the polar coordinate systems in the areas, are called C1 to C5. As shown in FIG. 1, these centers C1 to C5 are at different positions. More specifically, the center C1 of the polar coordinate system for the rods 21 in the area P1 is located at the same position as the innermost rod 21 in the area P5; the center C2 of the polar coordinate system for the rods 21 in the area P2 is located at the same position as the innermost rod 21 in the area P1; and in the same way, each of the centers C3 to C5 of the polar coordinate systems for the rods 21 in the area P3 to P5 is located at the same positions as the innermost rod 21 in the areas P2 to P4.

When the sector-shaped photonic crystals are disposed in this way such that the centers C1, C2, C3, C4, and C5 of the polar coordinate systems are shifted to be in the areas P5, P1, P2, P3, and P4, respectively, the concentric circles made by the rods 21 are shifted by one turn between the areas adjoining at the interfaces S1 to S5. More specifically, an arc of rods 21 in the tenth turn in the area P1 is smoothly connected to an arc of rods 21 in the ninth turn in the area P2; an arc of rods 21 in the ninth turn in the area P2 is smoothly connected to an arc of rods 21 in the eighth turn in the area P3; and in the same way, connections are made at the interfaces S3 to S5. For example, at the interface S5, an arc of rods 21 in the sixth turn in the area P5 is smoothly connected to an arc of rods 21 in the fifth turn in the area P1.

This is because the distances from the center to rods 21 disposed in the same turn becomes shorter or longer gradually as an adjoining area is approached, to connect to rods 21 at the inner or outer turn in the adjoining area at each of the interfaces S1 to S5. Therefore, an arc of rods 21 in the 10th turn in the area P1 is smoothly connected to an arc of rods 21 in the fifth turn in the area P1 after a counterclockwise turn of 360 degrees, and is further connected inwardly at repetitive turns of 360 degrees.

When sector-shaped photonic crystals having the same structure are connected in this manner with their periodic arrangements shifted in the radial direction by one array period, rods 21 on different turns are connected smoothly and the rods 21 are continuously disposed in a spiral manner with repeated turns of 360 degrees. In addition, when some of the rods 21 are removed in a spiral manner, a spiral optical waveguide is produced.

The photonic structure having the structure shown in FIG. 1 can be made, for example, using silicon cylinders (having a refractive index of 3.4) arranged in air (having a refractive index of 1.0). The structure can be manufactured, for example, by the following procedure.

1. Subject a surface of a silicon substrate to thermal oxidization to form a thermally oxidized film.

2. Using an electron beam drawing apparatus, apply electron-beam resist to the thermally oxidized film and expose the film to electron beams to form thereon a pattern in which silicon rods are arranged. This rod arrangement pattern is formed at a plurality of areas simultaneously on the same surface of the silicon substrate.

3. Develop the resist, and then etch the thermally oxidized film with a reactive ion etching apparatus using the resist pattern as a mask.

4. Remove the resist pattern, and then, etch the silicon substrate vertically with an inductively coupled plasma reactive ion etching apparatus using the thermally oxidized film as a mask. If the silicon substrate is 300 μm thick, for example, vertical etching is performed by only 1 μm from the surface. The rods are not etched away but remain and are supported by the silicon substrate.

5. Remove the thermally oxidized film by ashing to complete the photonic structure.

The optical propagation characteristics of the photonic structure were calculated by a finite-difference time domain (FDTD) method. The radius r of the rods 21 was set to 0.22 μm and the period a of concentric circles in the radial direction (array period of rods 21 in the radial direction) was set to 0.88 μm. This simulation was conducted two dimensionally (in the X-Z plane), and the length of the rods 21 in the Y direction (the center axis direction of the rods 21) was assumed to be infinite. The following results were obtained all in TE polarization (the oscillation directions of electric fields are perpendicular to the plane of the drawing).

Figure 3A:
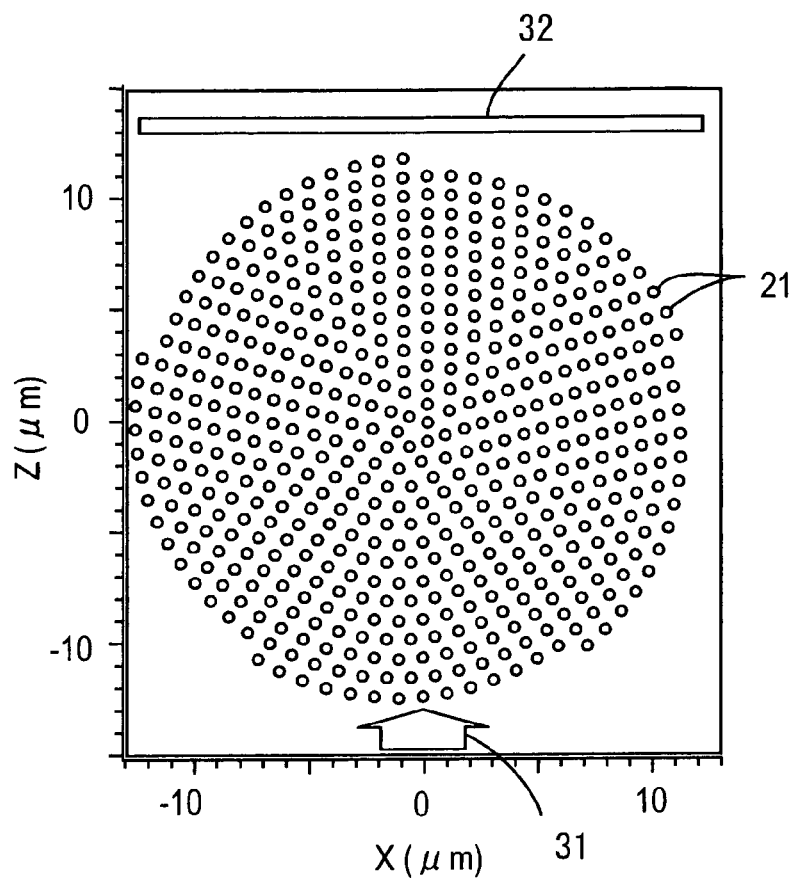
FIG. 3A is a diagram showing conditions used in calculating an optical transmission spectrum for the photonic structure shown in FIG. 1.
Figure 3B:
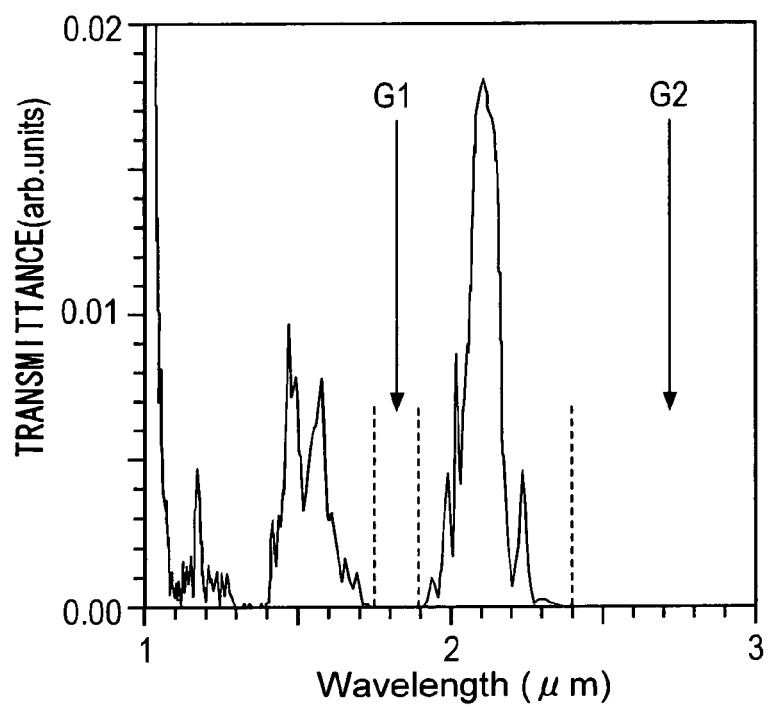
FIG. 3B is a graph showing the result of the calculation.

The transmission spectrum was calculated at the position of a monitor 32 when light 31 was incident in the direction of an arrow indicated in FIG. 3A, parallel to the X-Z plane. FIG. 3B shows the result. From FIG. 3B, it was found that the transmittance is zero in a zone G1 from a wavelength of 1.75 μm to a wavelength of 1.90 μm and in a zone G2 from a wavelength of 2.40 μm to longer, which means that light falling in these wavelength zones cannot propagate through the photonic structure. In other words, it was found that photonic band gaps exist in these wavelength zones. Changes in the photonic band gaps were also examined with light incident in different directions. It was found that the positions of the photonic band gaps did not change, which means that the photonic band gaps exist isotropically.

Figure 4:
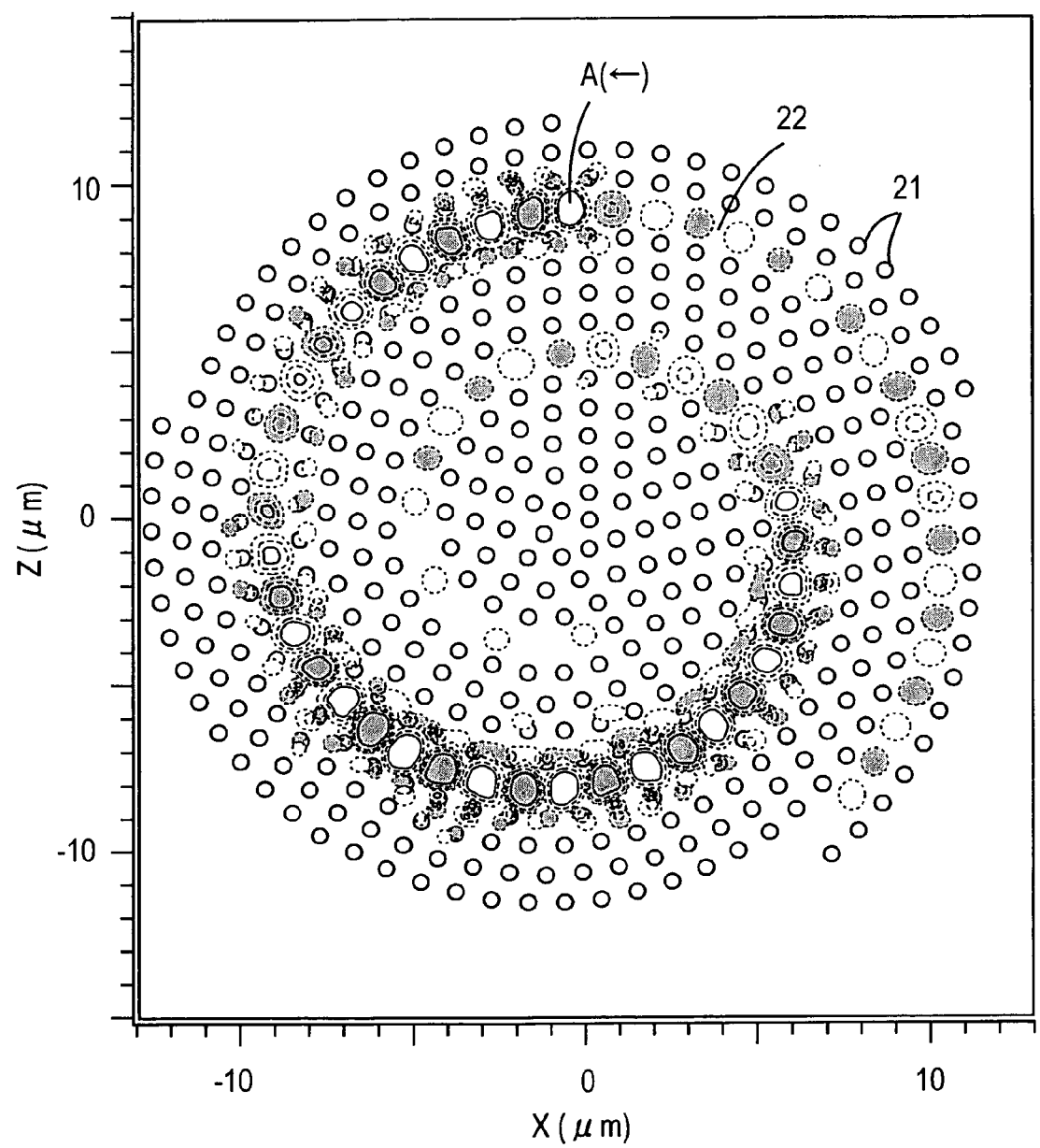
FIG. 4 is a diagram showing, in outline, electric-field intensities in a spiral optical waveguide formed in the photonic structure shown in FIG. 1.

Next, as shown in FIG. 4, rods 21 were removed in a spiral manner to form an optical waveguide 22. Continuous light having a wavelength of 1.80 μm, which falls in one of the photonic band gaps, was incident in the direction of an arrow indicated in FIG. 4 from a point A, parallel to the X-Z plane to check the intensities of electric fields guided through the optical waveguide 22 to investigate the guiding characteristics. In FIG. 4, the intensities of the electric fields are indicated by contour lines shown in solid lines, broken lines, and short broken lines in descending order, and negative electric fields are shown in gray.

As a result, high electric-field intensities were found only in the optical waveguide 22, as shown in FIG. 4. This means that the light incident on the optical waveguide 22 is reflected by the photonic band gaps formed by side walls in the rod arrangement and propagates only in the optical waveguide 22. From this result, it was found that the optical waveguide functions as a spiral optical waveguide.

Conventionally, it had not been clear that a spiral optical waveguide could actually guide light. As described above, the present invention confirmed for the first time that a structure formed by connecting a plurality of sector-shaped polar-coordinate-system photonic crystals having the same structure, with the centers of the polar coordinate systems being shifted, has a photonic band gap and that, when light having a wavelength which falls in the photonic band gap is incident on a spiral optical waveguide formed by removing a spiral part from the structure, the optical waveguide guides the light.

In FIG. 1, the photonic structure is formed by connecting the sector-shaped photonic crystals having the same structure and shifted by one period. They may be connected in such a manner as to be shifted by two or more periods. In other words, when the sector-shaped photonic crystals are connected so as to be shifted by an integer multiple (two or more) of the period of variation in the refractive index in the radial direction, a spiral optical waveguide can be formed in the same way.

When the above-described principle is used, sector-shaped photonic crystals having any rotational symmetry, for example, not only five-fold as shown in FIG. 1 but four-fold or six-fold rotational symmetry, can be connected with the centers shifted by an integer multiple of the period of the variation in refractive index in the radial direction to form a structure where arcs of rods 21 are smoothly connected in a spiral manner in the same way. Since an arc of rods 21 is shifted inwardly or outwardly at each connecting plane (each heterointerface), the higher the number of connecting planes, the larger the shift between arcs of rods 21 connected to each other when a 360-degree turn is made (at S5 in FIG. 1).

The periodic parameters of the sector-shaped photonic crystals, such as the radius r of the rods 21 and the array period a of the rods 21 in the radial direction, can be appropriately designed according to the wavelength of light to be guided and polarization conditions.

In the above case, each of the sector-shaped photonic crystals formed by removing the line of rods 21 indicated by broken lines in FIG. 2, that is, the line of rods 21 disposed at the rightmost line, is used. Sector-shaped photonic crystals formed by removing a line of rods 21 disposed at the leftmost line may be used. In other words, sector-shaped photonic crystals formed by removing a line of rods 21 extending in the radial direction along one of the boundaries in the circumferential direction may be used.

Second Embodiment

Figure 5:
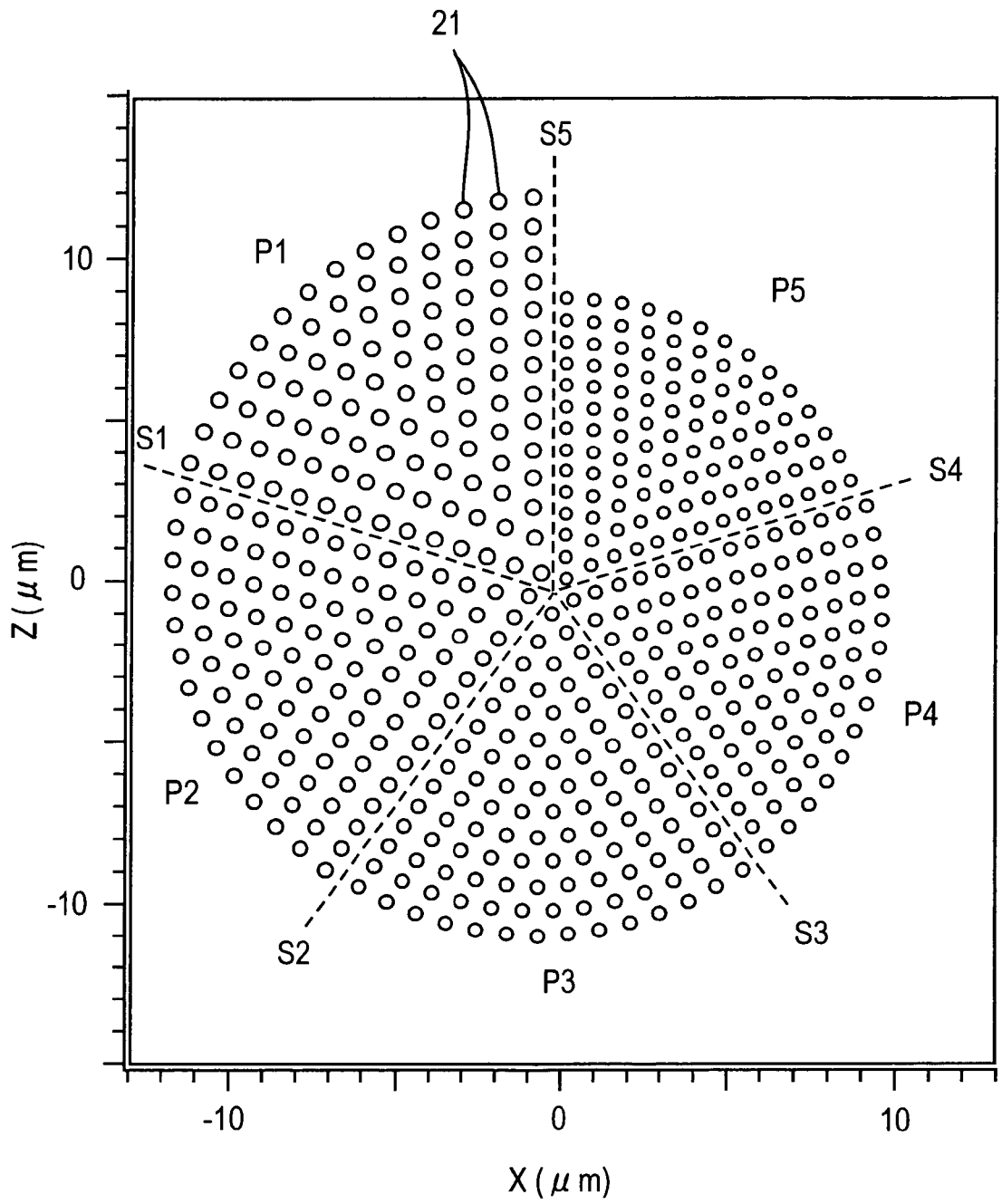
FIG. 5 shows an example photonic structure according to a second embodiment of the present invention.

FIG. 5 shows an example photonic structure according to a second embodiment of the present invention. The second embodiment is the same as the first embodiment in that five sector-shaped polar-coordinate-system photonic crystals are combined to form a photonic structure but is different from the first embodiment in that the five sector-shaped photonic crystals do not have the same structure, though they have similar shapes. More specifically, a sector-shaped photonic crystal disposed in an area P2 is similar to but smaller than a sector-shaped photonic crystal disposed in an area P1. The array period a and the radius r of rods 21 of the photonic crystal disposed in the area P2 are reduced by the same ratio from those of the photonic crystal disposed in the area P1. In the same way, sector-shaped photonic crystals disposed in areas P3 to P5 are similar to but smaller than the sector-shaped photonic crystals disposed in the areas P2 to P4, respectively. In other words, the sector-shaped photonic crystals are sequentially reduced from the area P1 to the area P5 counterclockwise. At interfaces (heterointerfaces) S1 to S5, the period of the variation in refractive index changes discontinuously. When the reduction ratio of the sector-shaped photonic crystal $P(x+1)$ ($x=1, 2, 3,$ and $4$) with respect to the sector-shaped photonic crystal $P(x)$ is called a magnification, the magnification is 94% in FIG. 5.

The sector-shaped photonic crystal disposed in the area P1 has the same structure as the sector-shaped photonic crystal of the first embodiment, shown in FIG. 2. The rods 21 are arranged concentrically in 14 turns.

When a sector-shaped structure in which the period of the variation in refractive index is defined in the polar coordinate system is connected to structures similar thereto, the distances from rods 21 on the same turn to the center of each concentric circle become smaller as the turn is followed counterclockwise. It is possible to smoothly connect an arc of rods 21 disposed in a certain turn in the area P5 to an arc of rod 21 disposed in a turn different from the certain turn, in the area P1 at a position after a turn of 360 degrees (at the interface S5 in FIG. 5).

In FIG. 5, for example, the positions of the centers C1 to C5 (not shown) of the polar coordinate systems for the rods 21 in the areas P1 to P5 are controlled such that an arc of rods 21 disposed in the 11th turn in the area P1 is smoothly connected to arcs of rods 21 in adjoining areas at the heterointerfaces S1 to S4. With this control, an arc of rods 21 disposed in the 11th turn in the area P5 is smoothly connected to an arc of rods 21 disposed in the eighth turn in the area P1 at the interface S5. When the ratio of similitude is controlled in this way, an arc of rods 21 disposed in any turn in the area P5 can be smoothly connected to an arc of rods 21 disposed in any turn in the area P1 at the interface S5.

When sector-shaped photonic crystals having similarity and different periodicity of variation in refractive index are combined, arcs of rods disposed in different turns can be smoothly connected. With this connection, rods can be continuously arranged in a spiral manner with repeated 360-degree turning, also in this embodiment. When a line of these rods is removed, a spiral optical waveguide is made.

Figure 6:
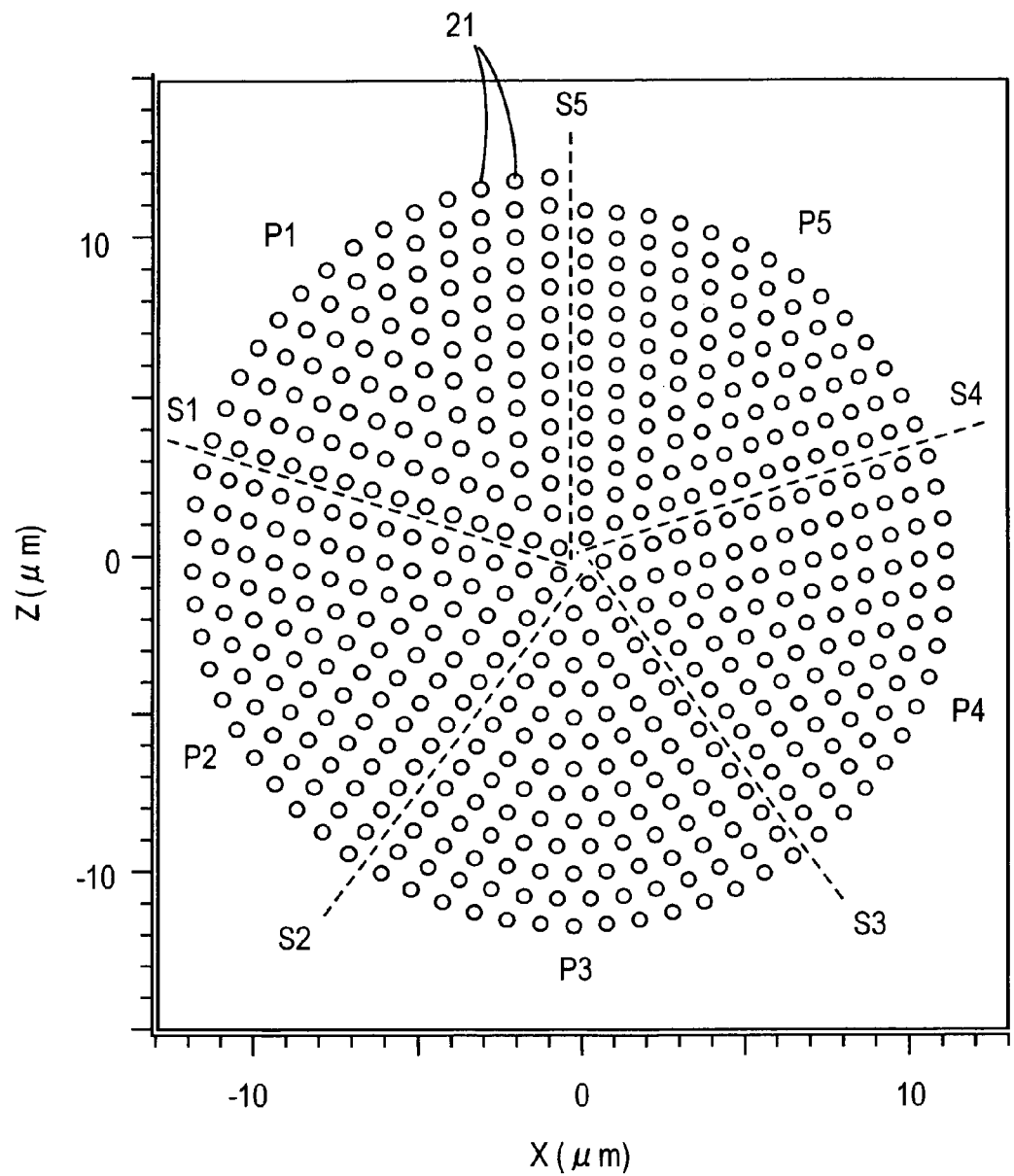
FIG. 6 shows another example photonic structure according to the second embodiment of the present invention.

FIG. 6 shows a photonic structure made by connecting five similar sector-shaped polar-coordinate-system photonic crystals with a magnification of 98%. The optical propagation characteristics of the photonic structure shown in FIG. 6 will be described below in the same way as in the first embodiment. Simulation conditions and other factors for the optical propagation characteristics are the same as in the first embodiment (they are also the same as in third and fourth embodiments, described later).

The photonic structure is made by arraying silicon cylinders in air, as in the first embodiment. The array periods a of concentric circles in a radial direction and the radii r of the rods 21 in the areas P1 to P5 are as follows:

Area P1: $a=0.880$ μm, $r=0.220$ μm
Area P2: $a=0.862$ μm, $r=0.216$ μm
Area P3: $a=0.845$ μm, $r=0.211$ μm
Area P4: $a=0.828$ μm, $r=0.207$ μm
Area P5: $a=0.812$ μm, $r=0.203$ μm The centers C1 to C5 (not shown) of the concentric circles in the areas P1 to P5 are disposed at different positions. The positions of the centers C1 to C5 are controlled such that an arc of rods 21 disposed in the 11th turn in the area P5 is connected to an arc of rods 21 disposed in the 10th turn in the area P1 at the interface S5.

Figure 7A:
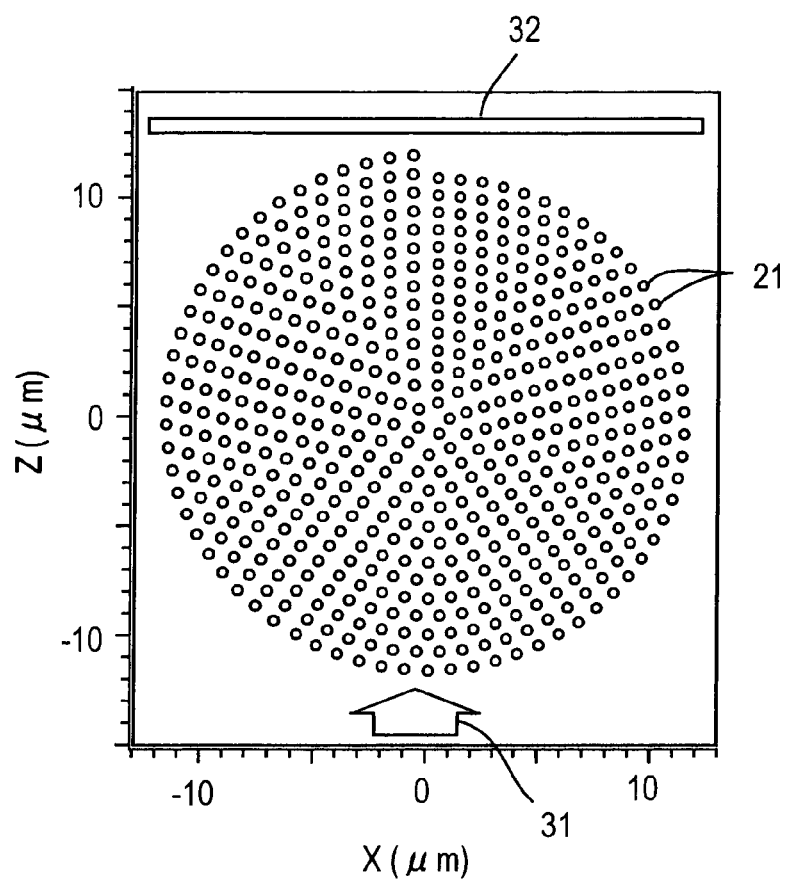
FIG. 7A is a diagram showing conditions used in calculating an optical transmission spectrum for the photonic structure shown in FIG. 6.
Figure 7B:
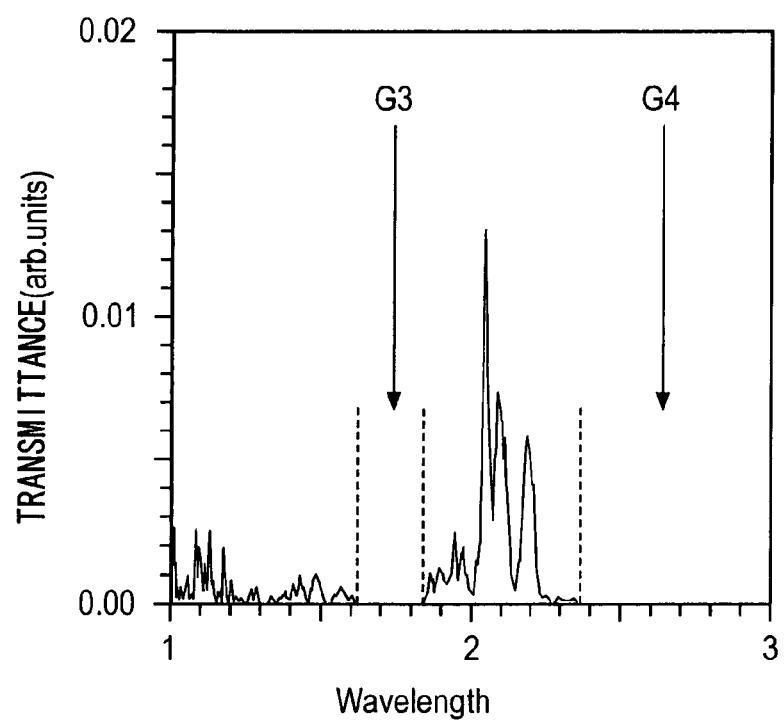
FIG. 7B is a graph showing the result of the calculation.

A transmission spectrum was calculated at the position of a monitor 32 when light 31 was incident in the direction of an arrow indicated in FIG. 7A. FIG. 7B shows the result. From FIG. 7B, it was found that the transmittance is zero in a zone G3 from a wavelength of 1.62 μm to a wavelength of 1.85 μm and in a zone G4 from a wavelength of 2.37 μm to longer, which means that light falling in these wavelength zones cannot propagate through the photonic structure. In other words, it was found that photonic band gaps exist in these wavelength zones. Changes in the photonic band gaps were also examined with light incident in different directions. It was found that the positions of the photonic band gaps did not change, which means that the photonic band gaps are isotropic.

Figure 8:
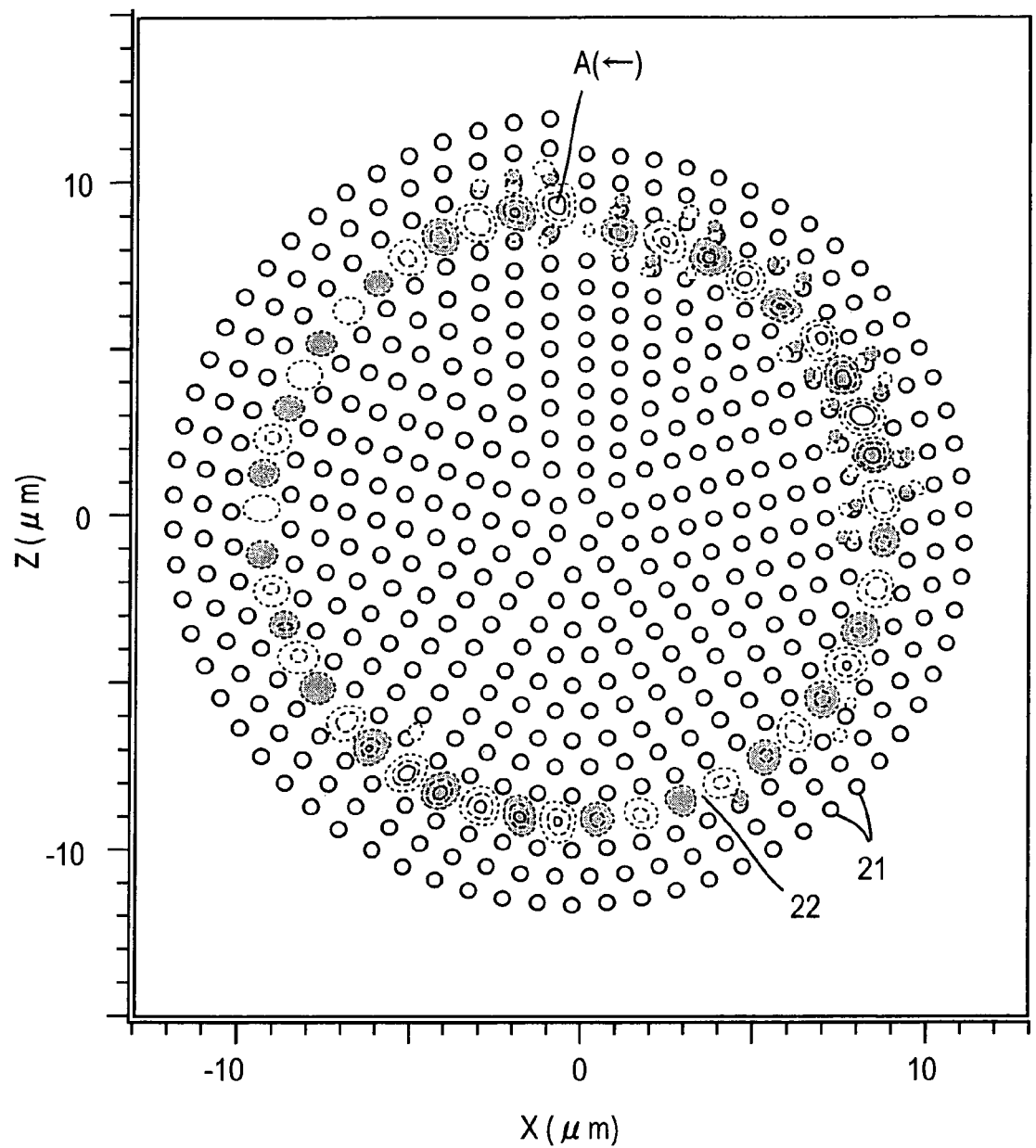
FIG. 8 is a diagram showing, in outline, electric-field intensities in a spiral optical waveguide formed in the photonic structure shown in FIG. 6.

Next, as shown in FIG. 8, rods 21 disposed in the 11th turn in each area were removed in a spiral manner to form an optical waveguide 22. Continuous light having a wavelength of 1.75 μm was incident in the direction of an arrow indicated in FIG. 8 from a point A, parallel to the X-Z plane to check the intensities of electric fields guided through the optical waveguide 22 to investigate the guiding characteristics. As a result, high electric-field intensities were found only in the optical waveguide 22. This means that the light incident on the optical waveguide 22 is reflected by the photonic band gaps formed by side walls of the rod arrangement and propagates only in the optical waveguide 22. From this finding, it was found that the optical waveguide functions as a spiral optical waveguide.

In the above case, since the rods 21 disposed in the 11th turn in each area were removed, the positional shift in the optical waveguide between the areas P5 and P1 at the interface S5 is as small as about one array period of the variation in refractive index in the radial direction. To propagate light only in an optical waveguide, it is necessary that the optical waveguide be sandwiched by side walls having photonic band gaps. It is sufficient if the side walls each have a thickness of four array periods or more. Therefore, when many rods 21 are arranged in the radial direction, not in 14 turns as described above, and rods 21 disposed on the 40th turn are removed, for example, the positional shift in the optical waveguide between the areas P5 and P1 at the interface S5 is set to about four array periods to successfully make a spiral optical waveguide.

When rods disposed in a larger number of turn are removed, a spiral optical waveguide is made with the ratio of similitude being set very close to 1. If rods disposed in the 160th turn are removed, for example, a spiral optical waveguide having a ratio of similitude of 99.5% and having a positional shift of four array periods at the interface S5 is made.

The five similar sector-shaped photonic crystals are connected in the above-described case. By using the above-described principle, not only five but also four or six similar sector-shaped photonic crystals can be combined to make a structure in which rods smoothly continue in a spiral manner in the same way. In those cases, the center angle of each sector is 90 or 60 degrees. The ratio of similitude between adjacent similar sector-shaped photonic crystals may be different at each connecting plane (heterointerface). It is possible to combine not only sector-shaped photonic crystals having the same center angle of the sectors but also sector-shaped photonic crystals having different center angles of the sectors.

Specific values used to form a spiral optical waveguide, such as the number of sector-shaped photonic crystals, the ratio of similitude, and the center angle of each sector, are appropriately determined such that an arc of rods 21 disposed in a certain turn in one of the sector-shaped photonic crystals to be connected can be smoothly connected to an arc of rods 21 disposed in another turn in another one of the sector-shaped photonic crystals to be connected at their connecting plane (heterointerface) after a turn of 360 degrees.

Third Embodiment

Figure 9:
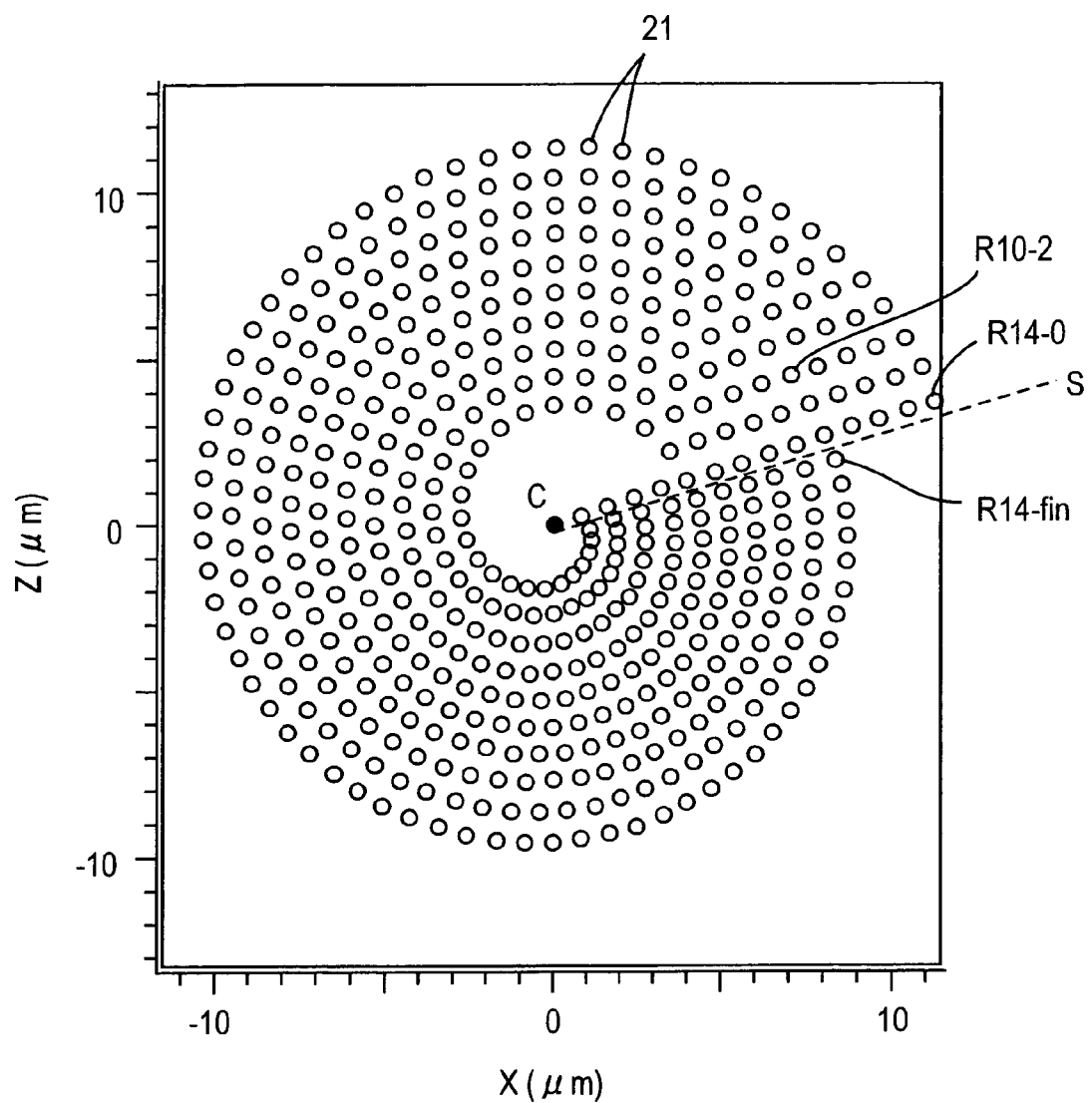
FIG. 9 shows an example photonic structure according to a third embodiment of the present invention.

FIG. 9 shows an example photonic structure according to a third embodiment of the present invention. This photonic structure has no translational symmetry, no rotational symmetry, and no regularity defined in a polar coordinate system. In the structure, rods 21 are arranged in a spiral manner with the distances from a reference point being gradually changed and some of the rods are combined. In other words, the rods 21 are arranged with the distances from the reference point, the center C, being monotonically changed.

The rods 21 are arranged on 14-turn curves starting at points at a broken line S and returning to the broken line S. From the first to fourth turns, rods 21 are disposed only at points at the broken line S. The name of each rod is defined as shown in FIG. 9, such as R14-0. A rod R14-0 is on the 14th-turn curve from the center C and also at the starting point (0th) at the broken line S. A rod on the n-th-turn curve and also at the m-th point is called Rn-m. The last rod on the n-th-turn curve and returning to the broken line S is called Rn-fin.

Figures 10, 11:
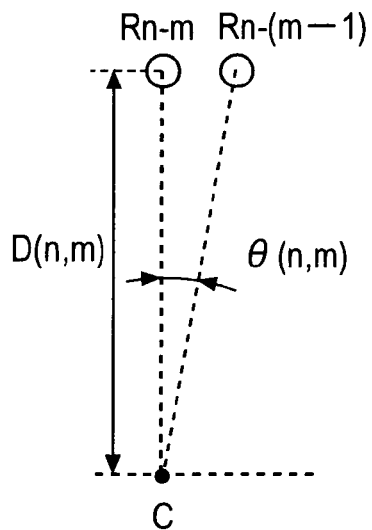
FIG. 10 is a diagram showing arrangement conditions for rods shown in FIG. 9.
FIG. 11 shows a table indicating example values of the arrangement conditions for the rods shown in FIG. 9.

As shown in FIG. 10, the distance D(n,m) between the rod Rn-m and the center C is given by the following expression.

$$D(n, m) = Dn \times \left(1 + B(n, m) \sum_{k=0}^{m} [\theta(n, k)/360]\right) ü@ü@ü@ \quad (1)$$

where Dn indicates the distance between a rod Rn-0 and the center C, θ(n, m) indicates the angle formed by the line connecting the rod Rn-m and the center C and the line connecting the rod Rn-(m−1) and the center C, θ(n,0) is set to 0, and B(n,m) indicates a value depending on n and m. For example, when B(n,m) is a positive value with respect to any m, the distances between the rods on the n-th turn and the center C monotonically increase as m increases; when B(n,m) is a negative value with respect to any m, the distances between the rods on the n-th turn and the center C monotonically decrease as m increases; and when B(n,m) changes as m changes, the distances between the rods on the n-th turn and the center C do not change monotonically as m increases.

FIG. 9 shows a case where B(n,m) and θ(n,m) have the same value at the same n, irrespective of the value of m, although they have different values at different values of n. In this case, B(n,m) is indicated by Bn and θ(n,m) is indicated by θn. In FIG. 9, Bn is a negative value. As for rods 21 on the 10th turn, for example, D(10,fin) is smaller than D(10,0) by about a magnification of (1+B10). Therefore, the rod 21 R10-fin is not connected to the rod 21 R10-0 but is connected to a rod 21 disposed on a turn inward from the 10th turn. By controlling the value of B10, the rod 21 R10-fin can be smoothly connected to a rod 21 on any turn. In FIG. 9, the value of B11 is controlled such that the rod 21 R10-fin is smoothly connected to a rod 21 on the sixth turn. The distances D(6,m) between the center C and the rods 21 on the sixth-turn curve are changed as m is changed, depending on B6, and can be controlled such that R6-fin is connected to a rod disposed on a curve inward from the sixth-turn curve.

In other words, when B(n,m) is appropriately controlled, rods 21 disposed on outer turns are smoothly connected to rods 21 disposed on inner turns with repeated turning of 360 degrees to arrange the rods 21 in a spiral manner. Then, a line of the rods 21 can be removed to form a spiral optical waveguide.

The optical propagation characteristics of the photonic structure shown in FIG. 9 will be described below.

The photonic structure is made by arranging silicon cylinders in air. Dn, Bn, and θn on each turn are set to values indicated in FIG. 1, and the radius r of the rods 21 is set to 0.22 μm.

Figure 12A:
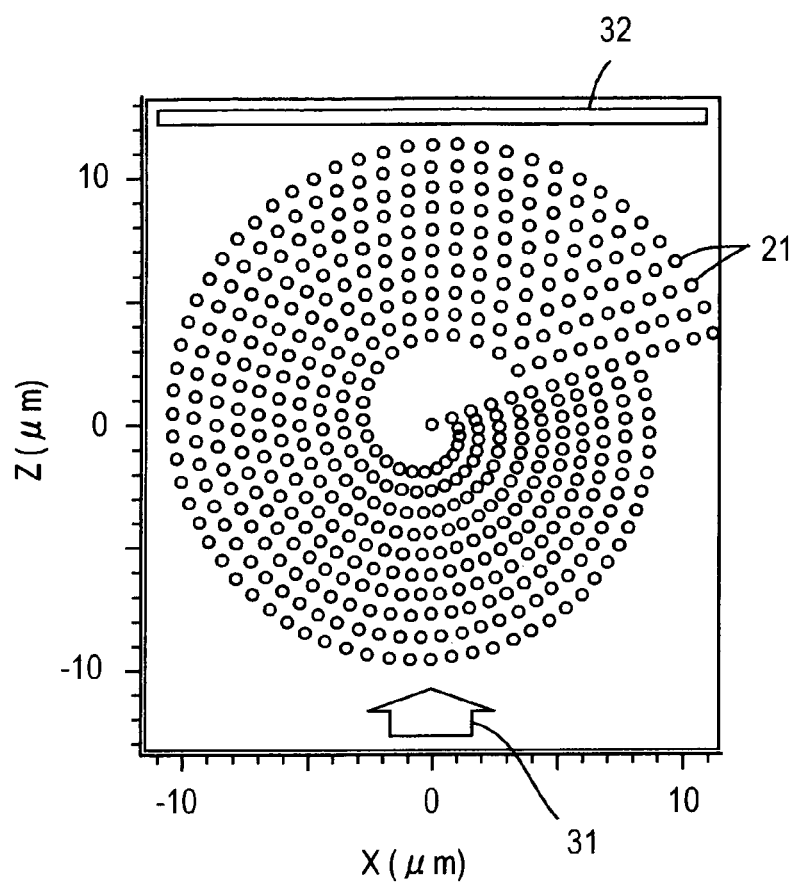
FIG. 12A is a diagram showing conditions used in calculating an optical transmission spectrum for the photonic structure shown in FIG. 9.
Figure 12B:
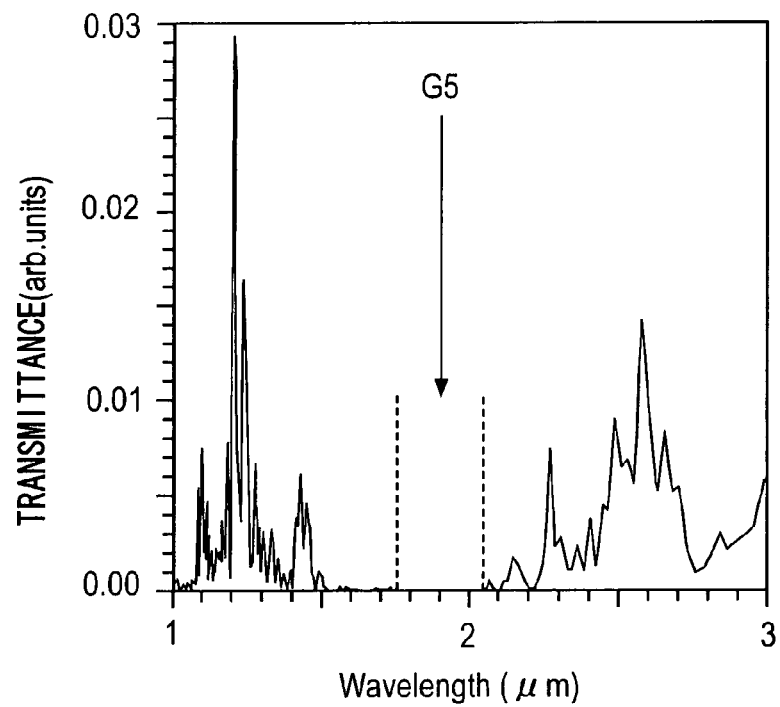
FIG. 12B is a graph showing the result of the calculation.

A transmission spectrum was calculated at the position of a monitor 32 when light 31 was incident in the direction of an arrow indicated in FIG. 12A. FIG. 12B shows the result. From FIG. 12B, it was found that the transmittance is zero in a zone G5 from a wavelength of 1.75 μm to a wavelength of 2.05 μm, which means that light falling in this wavelength zone cannot propagate through the photonic structure. In other words, it was found that a photonic band gap exists in this wavelength zone. Changes in the photonic band gap were also examined with light being incident in different directions. It was found that the position of the photonic band gap did not change, which means that the photonic band gap is isotropic.

Figure 13:
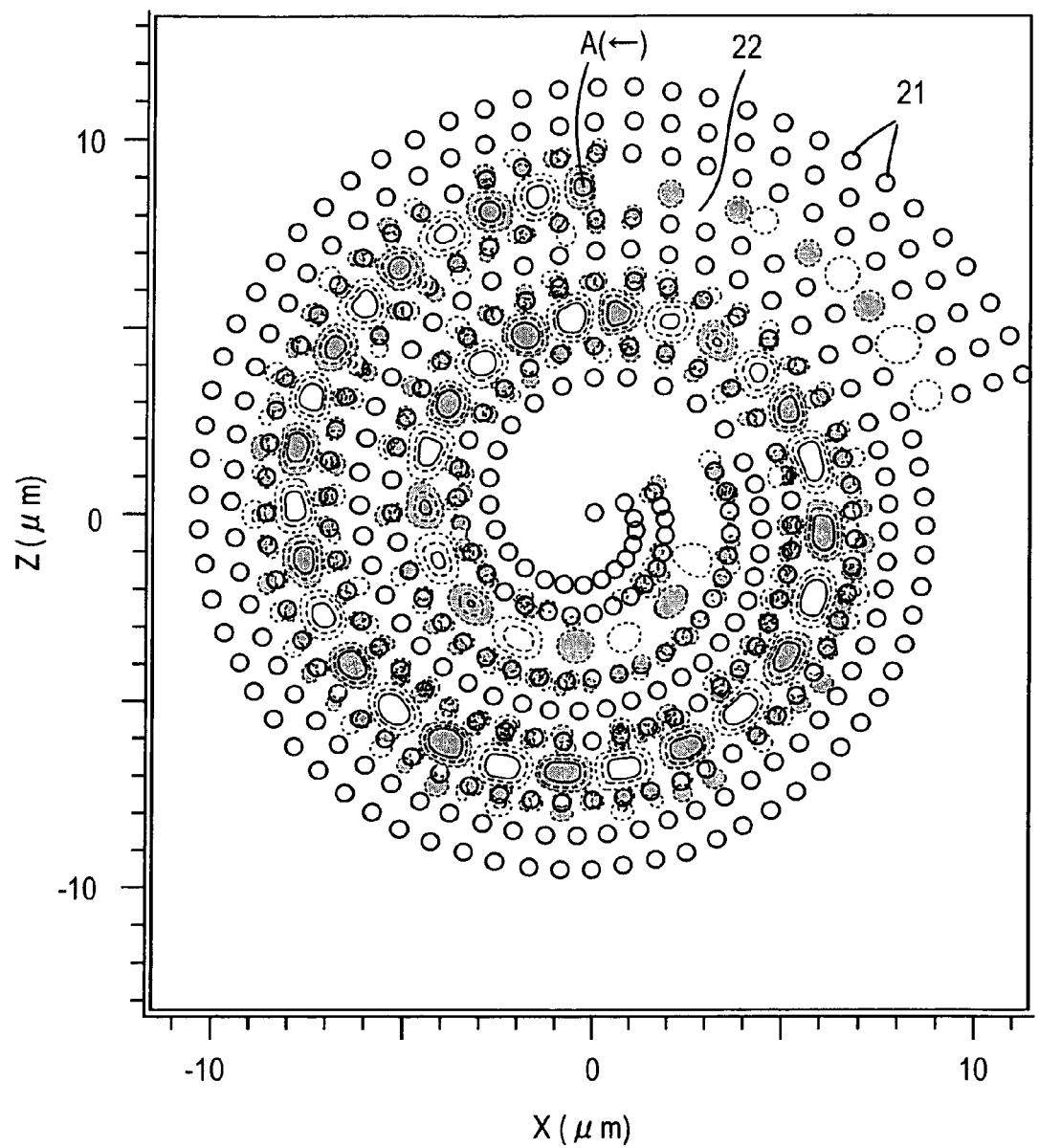
FIG. 13 is a diagram showing, in outline, electric-field intensities in a spiral optical waveguide formed in the photonic structure shown in FIG. 9.

Next, as shown in FIG. 13, rods 21 were removed in a spiral manner to form an optical waveguide 22. Continuous light having a wavelength of 1.80 μm was incident in the direction of an arrow from a point A in FIG. 13 to check the intensities of electric fields guided by the optical waveguide 22 to investigate the guiding characteristics. As a result, high electric-field intensities were found only in the optical waveguide 22. This means that the light incident on the optical waveguide 22 is reflected by the photonic band gap formed by side walls of the rod arrangement and propagates only in the optical waveguide 22. From this finding, it was found that the optical waveguide functions as a spiral optical waveguide.

Fourth Embodiment

Figure 14:
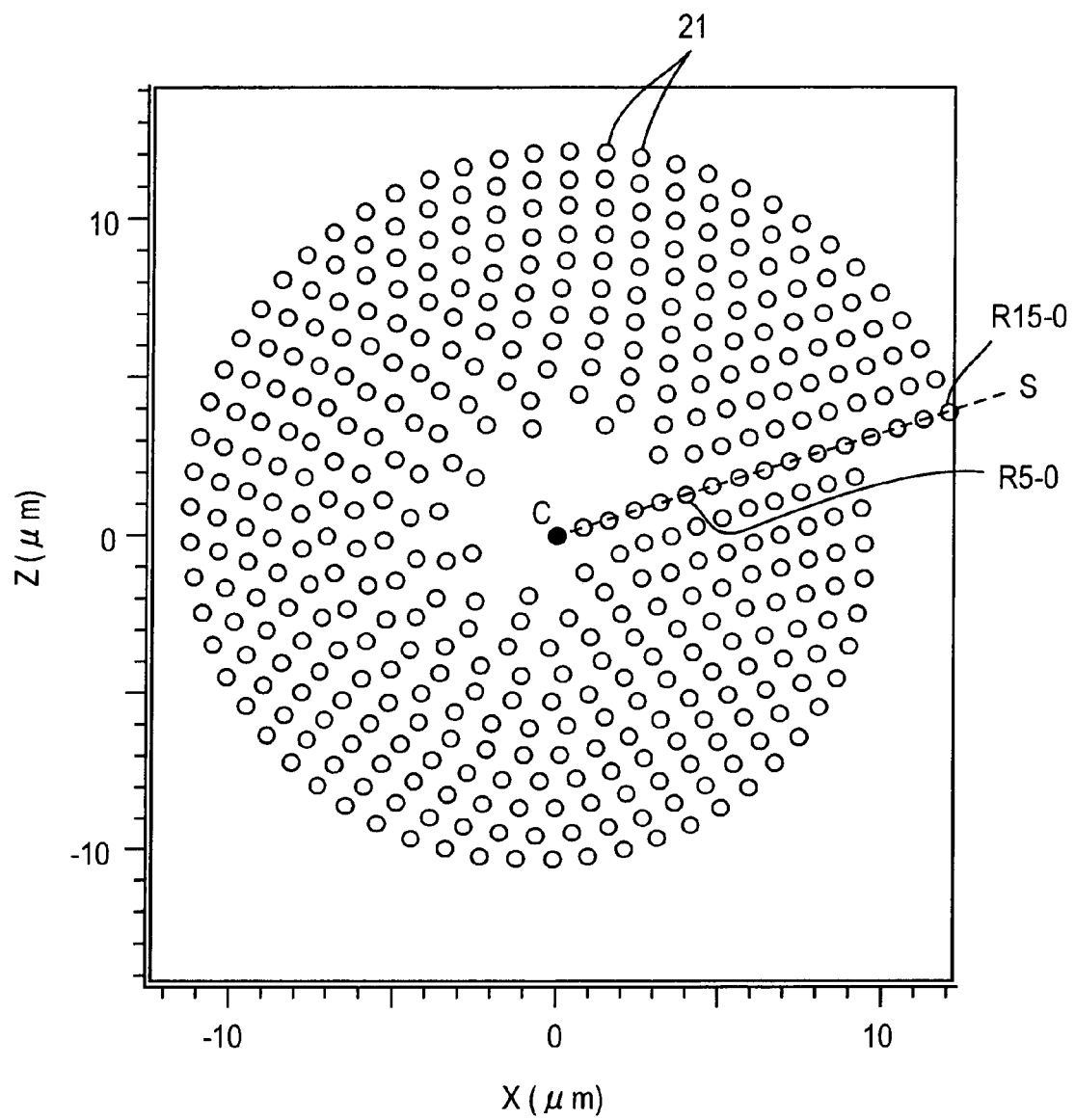
FIG. 14 shows an example photonic structure according to a fourth embodiment of the present invention.

FIG. 14 shows an example photonic structure according to a fourth embodiment of the present invention. The photonic structure has rods 21 arranged as expressed by Expression (1) in the same way as in the third embodiment and, furthermore, θ(n,m) in Expression (1) is given by the following expression.

$$\theta(n,m) = \phi n + (\Delta n/Nn) \times m \quad (2)$$

where φn, Δn, and Nn are different values determined by "n".

The values of φn, Δn, and Nn and those of Dn and Bn defined by Expression (1) are, for example, set as indicated in FIG. 15. From Expression (2), θ(n,m) increases as m increases when Δn/Nn is positive. The radius r of the rods 21 was set to 0.264 μm. The optical propagation characteristics of the photonic structure were obtained as described below. The photonic structure is made of silicon cylinders arranged in air.

Figure 16A:
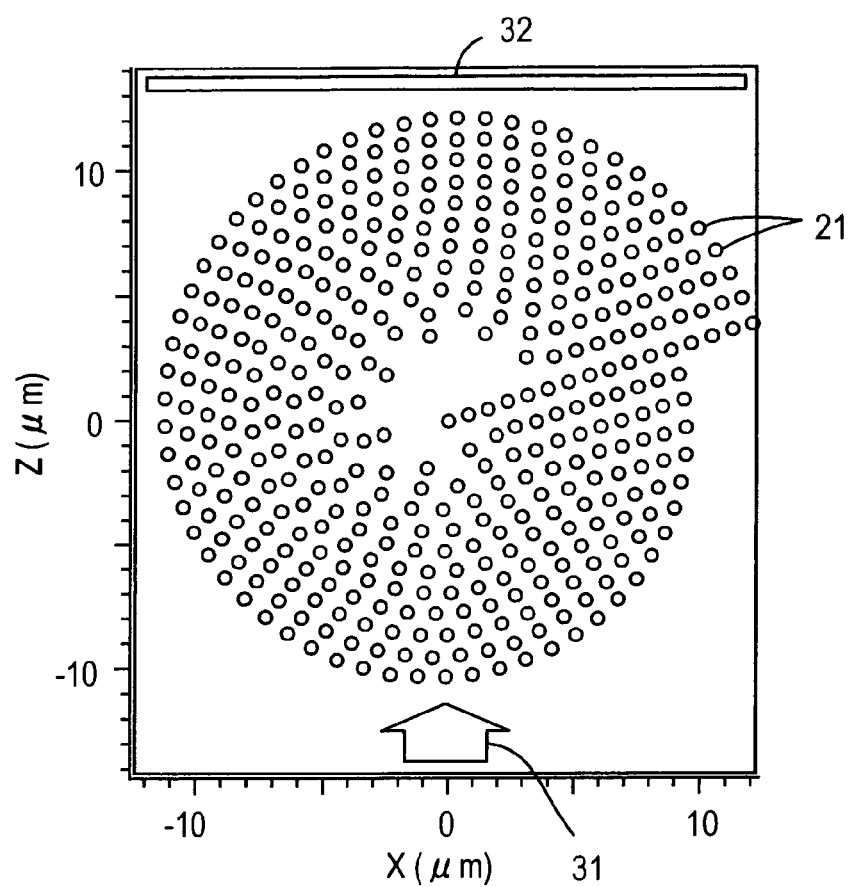
FIG. 16A is a diagram showing conditions used in calculating an optical transmission spectrum for the photonic structure shown in FIG. 14.
Figure 16B:
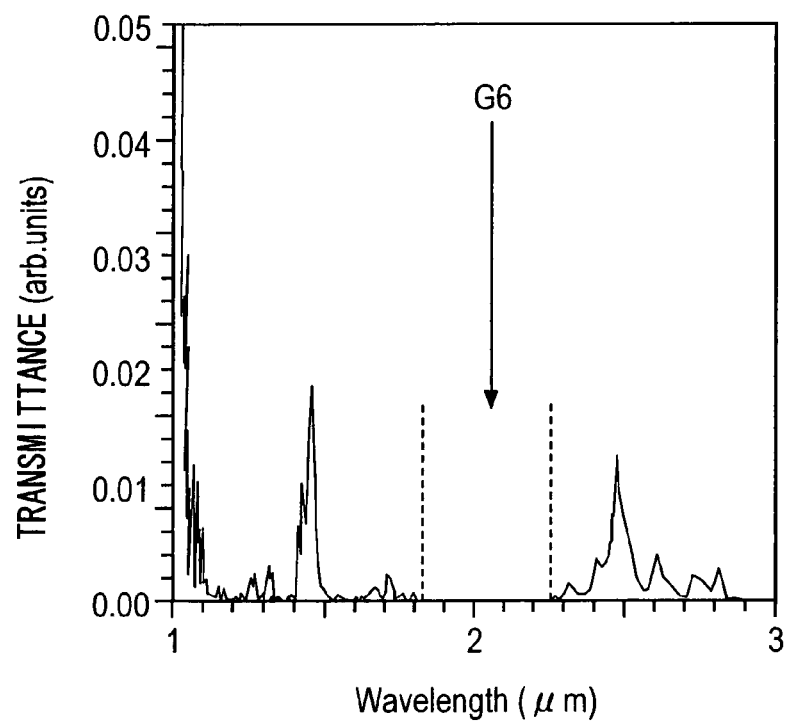
FIG. 16B is a graph showing the result of the calculation.

A transmission spectrum was calculated at the position of a monitor 32 when light 31 was incident in the direction of an arrow indicated in FIG. 16A. FIG. 16B shows the result. From FIG. 16B, it was found that the transmittance is zero in a zone G6 from a wavelength of 1.83 μm to a wavelength of 2.25 μm, and it was found that a photonic band gap exists in this wavelength zone. Changes in the photonic band gap were also examined with light being incident in different directions. It was found that the position of the photonic band gap did not change, which means that the photonic band gap is isotropic.

Figure 17:
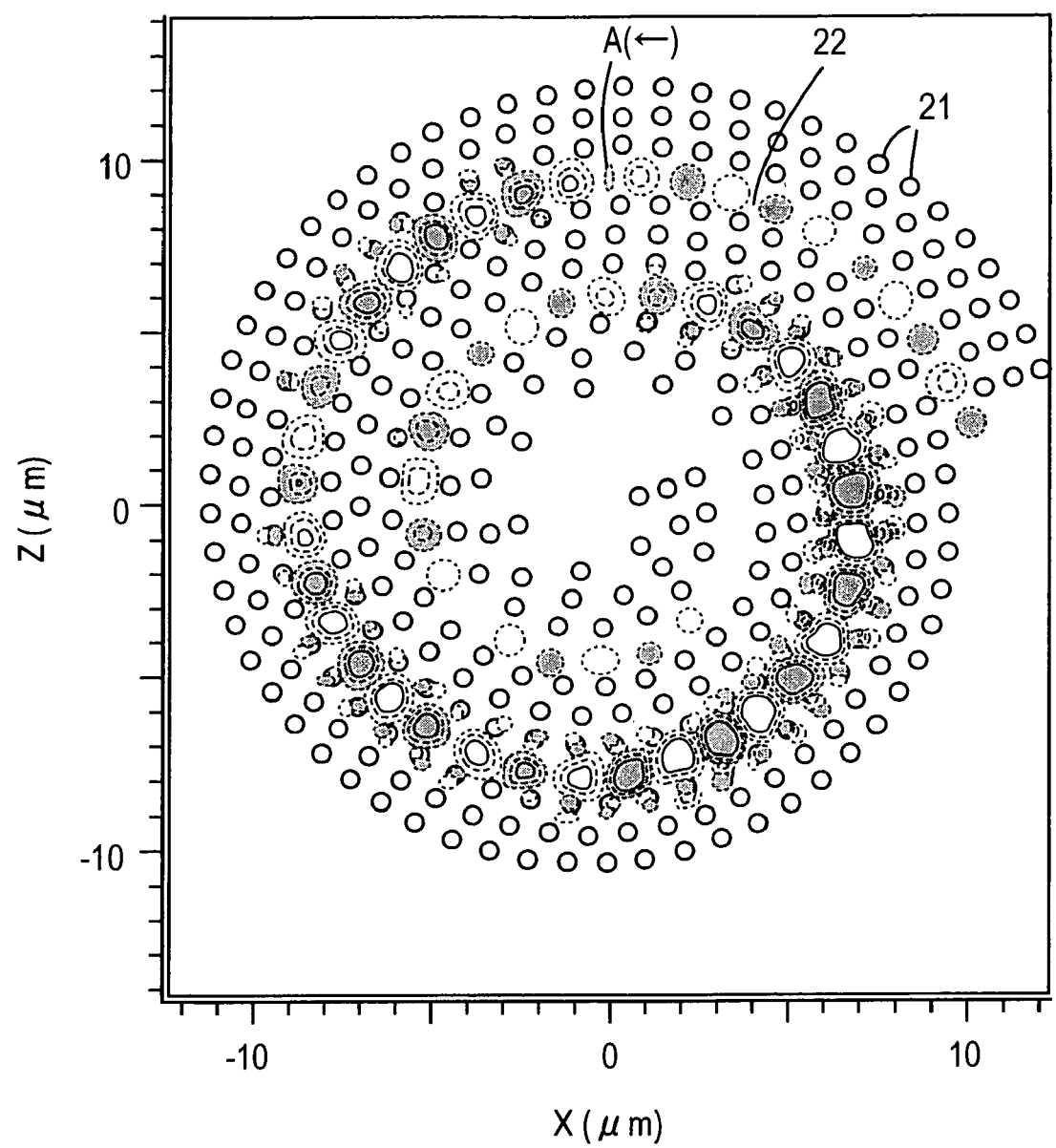
FIG. 17 is a view roughly showing electric-field intensities in a spiral optical waveguide formed in the photonic structure shown in FIG. 14.

Next, as shown in FIG. 17, rods 21 were removed in a spiral manner to form an optical waveguide 22. Continuous light having a wavelength of 1.95 μm was incident in the direction of an arrow indicated in FIG. 17 from a point A to check the intensities of electric fields guided through the optical waveguide 22 to investigate the guiding characteristics. As a result, high electric-field intensities were found only in the optical waveguide 22. This means that the light incident on the optical waveguide 22 is reflected by the photonic band gap formed by side walls of the rod arrangement and propagates only in the optical waveguide 22. From this finding, it was found that the optical waveguide functions as a spiral optical waveguide.

The third embodiment and the fourth embodiment are the same in that a plurality of lines of rods 21 serving as refractive-index elements are arranged in a spiral manner such that the distances from the rods 21 to the center C are gradually changed as the directions in which the rods are disposed with respect to the center C are changed. The photonic structures, made by arranging the rods 21 in this way, can implement optical waveguides that guide light efficiently.

B(n,m) and θ(n,m) can be specified in a desired manner. They can be determined depending on the wavelength of light to be guided and polarization conditions, to form a desired-curve-shaped optical waveguide.

Figure 18A:
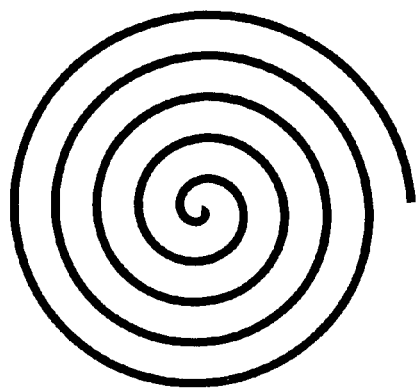
FIG. 18A is a diagram showing, in outline, the shape of a spiral optical waveguide.
Figure 18B:
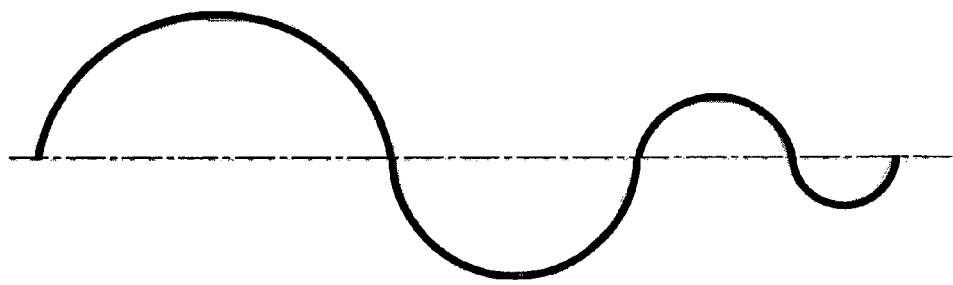
FIG. 18B is a diagram showing, in outline, the shape of a meandering optical waveguide.

Various embodiments have been described. According to the present invention, not only spiral optical waveguides such as that shown in FIG. 18A, but other optical waveguides having different shapes can be formed. For example, by changing the way of connecting the photonic crystals in the first or second embodiment, meander-shaped optical waveguides such as that shown in FIG. 18B can be formed. FIG. 18B shows a meander-shaped optical waveguide where the radius of curvature changes, formed by sequentially connecting sector-shaped polar-coordinate-system photonic crystals having a center angle of 180 degrees.

Meander-shaped optical waveguides such as that shown in FIG. 18B can also be formed by using the photonic crystals shown in the third or fourth embodiment. Based on a plurality of reference points, a plurality of sets of lines of rods 21 are arranged spirally; a part of lines of rods 21 in each set is removed to form an arc-shaped optical waveguide; and the formed arc-shaped optical waveguides are connected to each other. Although not shown in FIG. 18B, the pluralities of lines of rods 21 are formed at both sides of the optical waveguide indicated by a black solid line in FIG. 18B. The pluralities of lines of rods 21 sandwich the optical waveguide and extend along the optical waveguide.

The present invention can be applied not only to structures where cylinders made from a high-refractive-index material are arranged in a material having a low refractive index (cylinder-type photonic structures), such as those described above, but also to structures where holes are made in a material having a high refractive index and the holes are filled with a material having a low refractive index (hole-type photonic structures). In other words, the material filled in the holes may be used as a refractive-index element. The cylinders may be posts having a cross-sectional shape other than a circle. For example, prisms having a polygonal cross-sectional shape, such as triangular prisms, quadrangular prisms, and hexagonal prisms, may be used.

Figure 19A:
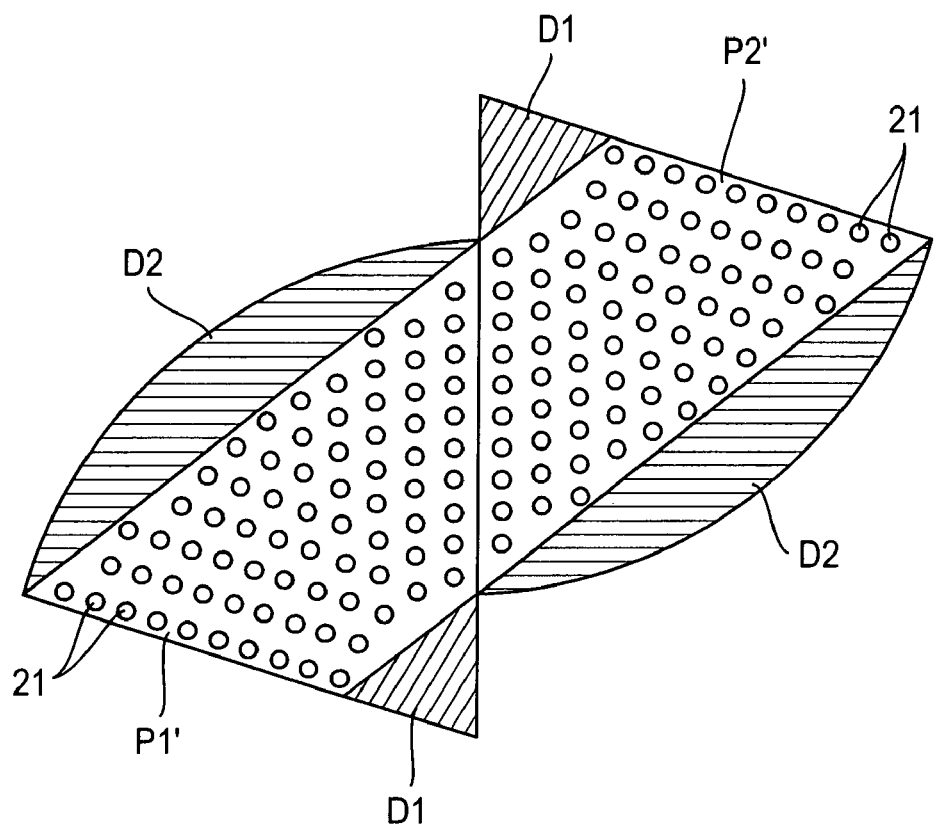
FIG. 19A shows an example photonic structure formed of photonic crystals having a shape other than a sector shape according to another embodiment.
Figure 19B:
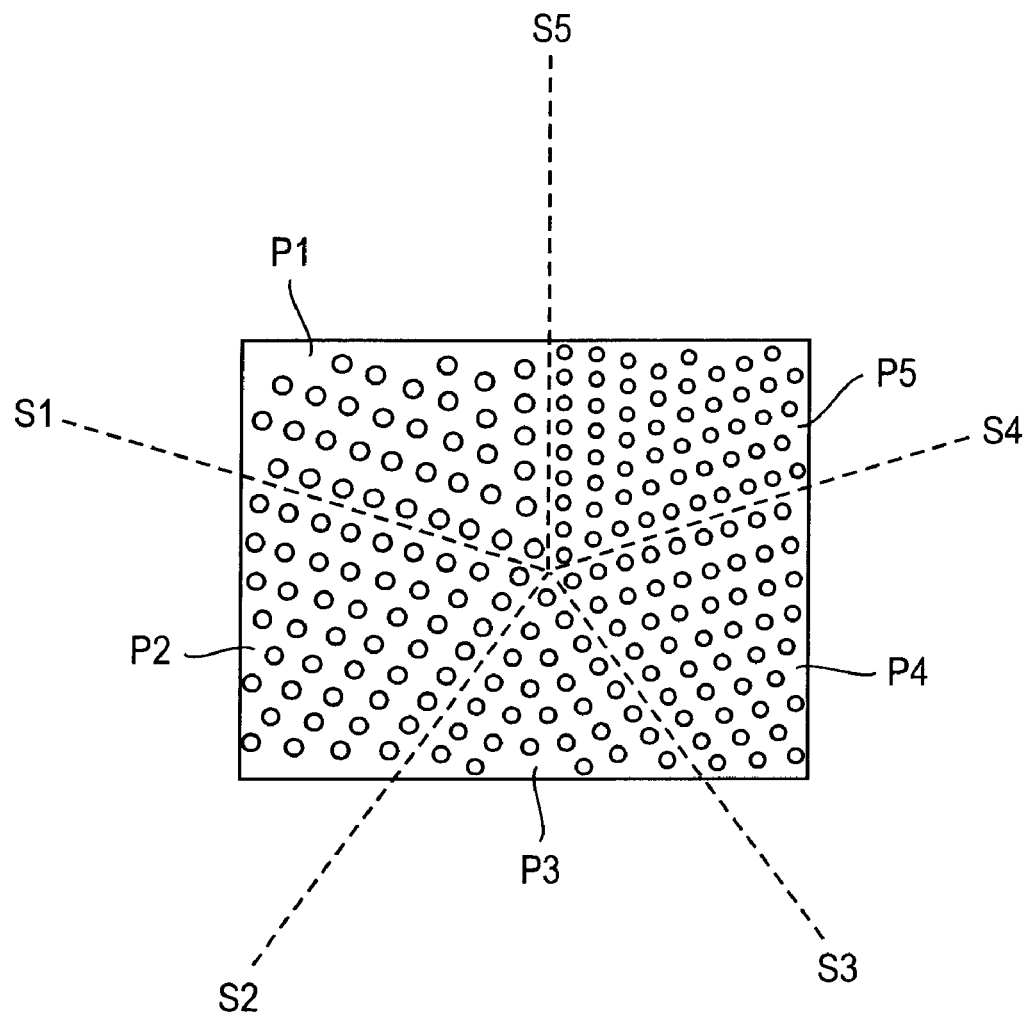
FIG. 19B shows an example photonic structure formed of photonic crystals having shapes other than a sector shape according to another embodiment.
Figure 20A:
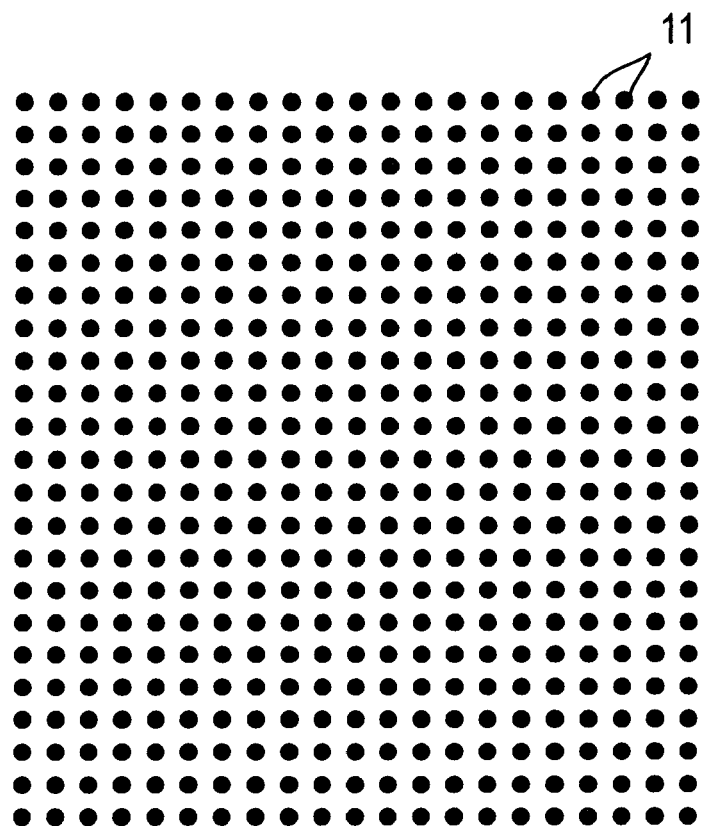
FIG. 20A shows an example of a conventional photonic crystal having translational symmetry.
Figure 20B:
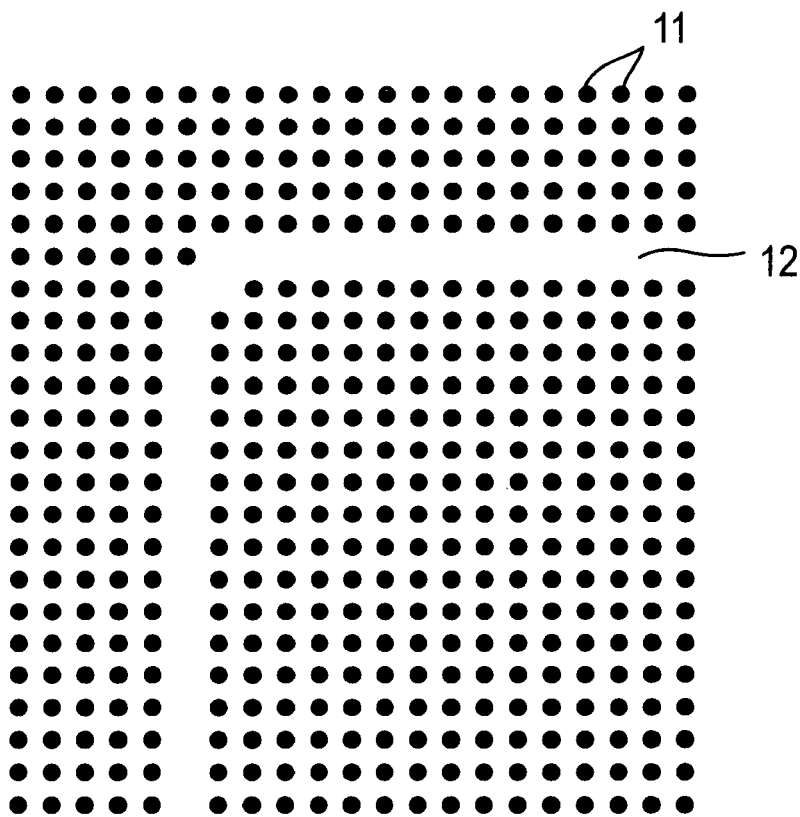
FIG. 20B shows an example line-shaped optical waveguide formed in the conventional photonic crystal shown in FIG. 20A.

In the first and second embodiments, the photonic crystals disposed in the areas P1 to P5 have sector shapes. They may have shapes other than sectors. More specifically, a photonic crystal having a sector shape may be partially cut out to have a desired shape. As shown in FIG. 19A, for example, a region D1 that includes the vertex of the sector-shaped photonic crystal and a region D2 that includes the arc thereof may be removed from the photonic crystal, and the resultant photonic crystal may be disposed in areas P1' and P2'. In the photonic structure according to the second embodiment, the sector-shaped polar-coordinate-system photonic crystals may be cut and disposed in the corresponding areas P1 to P5 as shown in FIG. 19B.

After the photonic structure is formed of the sector-shaped photonic crystals, as in the first or second embodiment, the photonic structure may be cut to have a desired size.

In the above description, the optical propagation characteristics were calculated with the height of the rods (silicon cylinders) 21 being regarded as infinite. Practically, it is necessary to confine light in the height direction (vertically). Conventionally, a slab (thin plate) of two-dimensional photonic crystal is vertically sandwiched by a material having a lower refractive index, such as air, to confine light vertically by way of total reflection caused by the refractive-index difference. Therefore, also in the present invention, when a slab-shaped photonic structure is made and sandwiched vertically by a material having a lower refractive index, the same advantages are provided.

According to the present invention, spiral photonic structures are provided. Therefore, for example, spiral optical waveguides can be made.

What is claimed is:

1. A photonic structure having no translational symmetry, comprising:
    a plurality of areas each comprising refractive-index elements arranged with periodicity defined in a polar coordinate system, which uses a distance in a radial direction and an angle in a circumferential direction, and has a center of the polar coordinate system as a reference; wherein
    a heterointerface is provided between adjoining areas of the plurality of areas, and
    the positions of the centers of the polar coordinate systems of the plurality of areas are different.

2. The photonic structure according to claim 1, wherein the positional difference of the centers of the polar coordinate systems in the adjoining areas at the heterointerface is an integer multiple of a period of variation in the refractive index in the radial direction.

3. The photonic structure according to claim 1, wherein
    each of the plurality of areas is the same sector-shaped area formed by removing from a first sector-shaped area a second sub-area,
        the first sector-shaped area having a refractive-index element disposed at the center of the corresponding polar coordinate system and a plurality of refractive-index elements arranged on respective arcuate line sections of concentrical circles around the center of the polar coordinate system,
        the second sub-area having a line of refractive-index elements extending in a radial direction of the first sector-shaped area along one of boundaries in a circumferential direction of the first sector-shaped area;
    mutually adjoining areas contact with each other at boundaries in the circumferential direction;
    the mutually contacting plane serve as the heterointerface; and
    the whole or a part of lines of refractive-index elements in the adjoining areas are connected together at the heterointerface.

4. A photonic structure comprising:
    a plurality of areas each comprising refractive-index elements arranged with periodicity defined in a polar coordinate system, which uses a distance in a radial direction and an angle in a circumferential direction, and has a center of the polar coordinate system as a reference; wherein
    a heterointerface is provided between adjoining areas of the plurality of areas where periods of variation in the refractive indexes of the adjoining areas are changed discontinuously.

5. The photonic structure according to claim 4, wherein,
    each of the plurality of areas is a sector-shaped area formed by removing from a first sector-shaped area a second sub-area,
        the first sector-shaped area having a refractive-index element disposed at the center of the corresponding polar coordinate system and a plurality of refractive-index elements arranged on respective arcuate line sections of concentrical circles around the center of the polar coordinate system,
        the second sub-area having a line of refractive-index elements extending in a radial direction of the first sector-shaped area along one of boundaries in a circumferential direction of the first sector-shaped area;
    the plurality of areas are similar in shape with each other and mutually adjoining areas contact with each other at boundaries in the circumferential direction;
    the mutually contacting plane serve as the heterointerface; and
    the whole or a part of lines of refractive-index elements in the adjoining areas are connected together at the heterointerface.

6. The photonic structure according to any one of claims 1 to 4, wherein defect region by removing some of the refractive-index elements is provided along a curve whose radius of curvature changes.

7. The photonic structure according to claim 6, wherein the curve is in a spiral shape.

8. A photonic structure having no translational symmetry, no rotational symmetry, and no regularity defined by a polar coordinate system, comprising:
    a plurality of lines of refractive-index elements each arranged spirally such that distances between a predetermined reference point and the refractive-index elements are gradually changed as the directions in which the refractive-index elements are disposed with respect to the reference point are changed, wherein
    each line of the whole or a part of the plurality of lines of refractive-index elements is connected to another line of the whole or the part of the plurality of lines of refractive-index elements at a line segment passing through the reference point.

9. The photonic structure according to claim 8, wherein there is provided a line defect region in some of the refractive-index elements.

10. The photonic structure according to claim 9, wherein the line defect region is in a spiral shape with respect to the reference point as the center of the spiral.

* * * * *